(12) United States Patent
Gonzalez et al.

(10) Patent No.: US 7,292,642 B2
(45) Date of Patent: Nov. 6, 2007

(54) REFERENCE SYMBOL MULTICARRIER SIGNAL DESIGNED TO LIMIT INTERSYMBOL INTERFERENCE

(75) Inventors: Alberto Gonzalez, Rennes (FR); Dominique Lacroix-Penther, Rennes (FR)

(73) Assignee: France Telecom, Paris (FR)

( * ) Notice: Subject to any disclaimer, the term of this patent is extended or adjusted under 35 U.S.C. 154(b) by 663 days.

(21) Appl. No.: 10/380,899

(22) PCT Filed: Sep. 20, 2001

(86) PCT No.: PCT/FR01/02935

§ 371 (c)(1), (2), (4) Date: Jul. 14, 2003

(87) PCT Pub. No.: WO02/25883

PCT Pub. Date: Mar. 28, 2002

(65) Prior Publication Data

US 2004/0032909 A1   Feb. 19, 2004

(30) Foreign Application Priority Data

Sep. 20, 2000   (FR) .................................. 00 11998

(51) Int. Cl.
*H04L 23/02* (2006.01)
*H04L 5/12* (2006.01)

(52) U.S. Cl. .................. 375/261; 375/260; 375/298; 375/316

(58) Field of Classification Search ................ 375/260, 375/261, 298, 316
See application file for complete search history.

(56) References Cited

U.S. PATENT DOCUMENTS 5,278,844 A * 1/1994 Murphy et al. ............. 714/778

5,802,044 A * 9/1998 Baum et al. ................ 370/330

(Continued)

FOREIGN PATENT DOCUMENTS

EP   0 734 132   9/1996

(Continued)

OTHER PUBLICATIONS

"Estimating Channel Response From Pilot Subcarrier Pairs for OFDM Systems", Aiping Huang et al, Midwest Sumposium on Circuits and Systems, Aug. 1997, pp. 774-777.

(Continued)

*Primary Examiner*—David C. Payne
*Assistant Examiner*—Erin M. File
(74) *Attorney, Agent, or Firm*—Westman, Champlin & Kelly

(57) ABSTRACT

The invention relates to a multicarrier signal consisting of a temporal succession of symbols formed by a set of data elements, each of said data elements modulating a carrier frequency of said signal, said symbols being organized in successive frames each comprising a plurality of symbols, one of said carrier frequencies modulated, at a given point in time, by one of said data elements being called a carrier.

According to the invention, at least some of said frames each comprise at least one reference symbol integrally consisting of reference data elements known at least to one receiver and complying with at least one constraint on the value of at least one of said reference data elements, so as to obtain the reduction, at reception, of at least one interference term affecting at least another of said reference data elements.

18 Claims, 3 Drawing Sheets

Fig. 2

U.S. PATENT DOCUMENTS

| | | | |
|---|---|---|---|
| 6,014,412 A * | 1/2000 | Wiese et al. | 375/346 |
| 6,175,551 B1 * | 1/2001 | Awater et al. | 370/210 |
| 6,456,673 B1 * | 9/2002 | Wiese et al. | 375/346 |
| 6,459,744 B1 * | 10/2002 | Helard et al. | 375/354 |
| 6,529,783 B1 * | 3/2003 | Combelles et al. | 700/39 |

FOREIGN PATENT DOCUMENTS

| | | | |
|---|---|---|---|
| EP | 1195960 A2 * | 4/2002 | |
| WO | WO 95/07581 | 3/1995 | |

OTHER PUBLICATIONS

"An Analysis of Automatic Equalizers for Orthogonally Multiplexed AQM Systems", Botaro Hirosaki, IEEE Transactions of Communications, vol. 28, No. 1, Jan. 1980, pp. 73-83.

"Waveform Optimization for QQAM-OFDM Systems By Using Nonlinear Programming Algorithms", H.H. Chen et al., IEEE Vehicular Technology Conference, May 1997, pp. 1385-1389.

"Coded Arthogonal Frequency Division Multiplex", Bernard LeFloch et al., Proceedings of the IEEE, vol. 83, No. 6, Jun. 1995, pp. 982-996.

* cited by examiner

REFERENCE SYMBOL MULTICARRIER SIGNAL DESIGNED TO LIMIT INTERSYMBOL INTERFERENCE

CROSS-REFERENCE TO RELATED APPLICATION

This Application is a Section 371 National Stage Application of International Application No. PCT/FR01/02935 filed Sep. 20, 2001 and published as WO 02/25883 on Mar. 28, 2002 not in English.

FIELD OF THE INVENTION

The field of the invention is that of the transmission and broadcasting of digital information. The invention relates especially, but not exclusively, to the transmission and broadcasting of digital information with high spectral efficiency, on a limited frequency band, for example in a radio mobile environment.

BACKGROUND OF THE INVENTION

The technique of multicarrier modulation, associated for example with a technique of error correction encoding and an interlacing operation, provides an efficient solution to the problem of information broadcasting and transmission, for example in a radiomobile environment. Thus, the COFDM ("Coded Orthogonal Frequency Division Multiplexing") technique of modulation has been chosen for the DAB ("Digital Audio Broadcasting"), DVB-T ("Digital Video Broadcasting-Terrestrial") and HIPERLAN/2 ("High Performance Local Area Network") standards.

The multicarrier modulation used in the COFDM system, described for example in the French patent No. FR 2 765 757, comprises a particularly simple system of equalization, based on the insertion of a guard interval. This guard interval, also called a cyclic prefix, ensures that the system behaves well in the face of echoes, at the cost of a loss in spectral efficiency. It is in order to avert this loss, or at least to reduce it, that new multicarrier modulations are currently being studied. Among these, the invention relates especially to OFDM/OQAM ("Orthogonal Frequency Division Multiplexing/Offset Quadrature Amplitude Modulation") for which the carriers are shaped by the Iota prototype function. It may be recalled that the Iota prototype function, described for example in the patent document No. FR 2 733 869, has the characteristic of being identical to its Fourier transform. The invention can be applied of course also to any other type of multicarrier modulation, especially the OFDM/OQAM type, whatever the associated prototype function.

The method used for shaping an electrical signal from the information to be transmitted depends of course on the conditions in which such a signal is transmitted. Here below, we briefly recall the characteristics of a transmission channel, especially in a radiomobile environment, for a clearer understanding of the value of the use of multicarrier modulations in such a channel.

In a radiomobile environment, the wave that is sent undergoes multiple reflections in its journey, and the receiver therefore receives a sum of delayed versions of the sent signal. Each of these versions is randomly attenuated and phase-shifted. This phenomenon, known as delay spread, generates inter-symbol interference (ISI). For example, in an urban type of environment, the delay spread is in the range of a few microseconds or less than a few microseconds.

Since the receiver (for example a motorist's mobile radiotelephone) is assumed to be in motion, the Doppler effect also acts on each path. This results in a frequency shift of the receiver spectrum, proportional to the speed of movement of the receiver. There also exist many other types of Doppler effects, all of which can be taken into account in the present invention.

The combination of these effects results in a non-stationary transmission channel, showing deep fading at certain frequencies (a frequency-selective channel is thus obtained). For certain applications, which are particularly useful in the context of the invention, the transmission band has a width greater than that of the coherence band of the channel (namely the band for which the frequency response of the channel may be considered to be constant over a given duration). Fading phenomena therefore appear in the band: i.e., at a given point in time, certain frequencies of the band are highly attenuated.

To overcome these different phenomena (due to the ISI and the Doppler effect), the addition of a guard interval was envisaged especially in OFDM type systems. The guard interval envisaged was one in which no payload information is transmitted, so as to ensure that all the information received comes from one and the same symbol. In the case of a coherent demodulation of the sub-carriers, the distortion contributed by the channel is then corrected by estimating its value at every point of the time-frequency network.

The introduction of such a guard interval of this kind reduces the problems related to inter-symbol interference, but one drawback of this prior art technique is that its spectral efficiency is reduced, since no information is transmitted during the guard interval period.

In the invention, therefore, a technique was sought to reduce the inter-symbol interference affecting the multiple carrier signals, without introducing any guard interval.

In order to provide for clearer understanding of the phenomena of interference between the symbols and/or between the carriers of a multiplex, the main characteristics of a multicarrier modulation are recalled here below. A multicarrier modulation is above all a digital modulation, namely a method for the generation of an electromagnetic signal, from a piece of digital information to be transmitted. The originality and value of such a modulation lies in the fact that it subdivides the frequency band allocated to the signal into a plurality of sub-bands, chosen so that their width is smaller than the coherence band of the channel, and on which the channel may therefore be considered to be constant for the duration of the transmission of a symbol. The digital information to be transmitted for this duration is then distributed to each of the sub-bands, so as to:

diminish the modulation speed (namely increase the symbol duration), without modifying the transmitted bit rate;

model the action of the channel on each of the sub-bands in a simple way, in making use of the model of the complex multiplier.

At reception, a low-complexity system for the correction of the received data (in which a complex division is carried out by the estimated channel) is used to retrieve the information sent on each of the carriers, except for the carriers that have undergone deep fading. In this case, if no step is taken to protect the information, the data conveyed by these carriers will be lost. A multicarrier system is therefore useful only if the generation of the electrical signal is preceded by digital processing of the data, for example the application of an error correction code and/or an interlacing for example.

There are especially two known types of orthogonal multicarrier modulation. They are described for example in the patent document No FR 2 733 869, whose characteristics are recalled here below.

The whole set of carriers of a multicarrier modulation forms a multiplex. Each of the carriers of this multiplex is shaped by means of a same prototype function, referenced $g(t)$, which characterizes the multicarrier modulation. The reference $v_0$ denotes the spacing between two adjacent carriers of the multiplex, and $\tau_0$ denotes the temporal spacing between two multicarrier symbols sent. The signal sent, at each instant $n\tau_0$, on the $m^{th}$ center frequency sub-band $v_m$, is $\alpha_{m,n} e^{i\varphi_{m,n}} e^{2i\pi v_m t} g(t-n\tau_0)$, where the values $\alpha_{m,n}$ represent the digital data to be transmitted. The expression of the signal sent in baseband (centered about the signal sent in baseband $Nv_0$) is then:

$$s(t) = \sum_n \sum_{m=0}^{2N-1} a_{m,n} e^{i\varphi_{m,n}} e^{2i\pi m v_0 t} g(t - n\tau_0) \quad (I)$$

It will be noted that, with the view to simplification, the case envisaged here is that of a signal having an even number of frequency sub-bands. It is of course more generally possible to write the signal in the form:

$$s(t) = \sum_n \sum_{m=0}^{M-1} a_{m,n} e^{i\varphi_{m,n}} e^{2i\pi m v_0 t} g(t - n\tau_0)$$

where M represents the number of carriers of a reference symbol of the signal. It will indeed be recalled that, according to a standard technique, digital data $\alpha_{m,n}$ with a value of zero are introduced into the edges of the spectrum, thus modifying the number of terms that effectively come into play in the above sum and, for example, make it possible to bring the number of carriers to an even number.

The functions $g_{m,n}(t) = e^{i\varphi_{m,n}} e^{2i\pi m v_0 t} g(t-n\tau_0)$ are called the time-frequency translated functions of $g(t)$. To retrieve the information transmitted by each of the sub-carriers, it is necessary to choose $g(t)$ and the phases $\varphi_{m,n}$ so that the above << time-frequency >> translated functions are separable. A sufficient condition for verifying this property of separability is that these translated functions should be orthogonal in the sense of being a scalar product defined on all the functions of finite energy (which is a Hilbert space in the mathematical sense).

It may be recalled that the space of the finite energy functions accepts the following scalar products:

the complex scalar product $$\langle x|y \rangle = \int_R x(t) y^*(t) dt$$

the real scalar product $$\langle x|y \rangle_R = \Re e \int_R x(t) y^*(t) dt$$

Thus, two types of multicarrier modulation are defined:
a complex type of multicarrier modulation, for which the function $g(t)$ chosen ensures an orthogonality, in the complex sense, of its translated functions. This is the case, for example, of OFDM, also called OFDM/QAM ("Orthogonal Frequency Division Multiplexing/ Quadrature Amplitude Modulation"). For a modulation of this kind, $\varphi_{m,n}=0$ and the data $\alpha_{m,n}$ are complex.
a real type of multicarrier modulation, for which the chosen function $g(t)$ guarantees an orthogonality, in the real sense, of its translated values. This is the case, for example, with the OFDM/OQAM, OFDM/OMSK (Offset Minimum Shift Keying) or OFDM/OQAM/ IOTA type modulations. For modulations of this type, $\varphi_{m,n}=(\pi/2)*(m+n)$ and the data $\alpha_{m,n}$ are real.

The characteristics of these two types of modulation give rise to notable differences, especially in terms of density of the time-frequency network associated with the modulation considered.

It may be recalled that, since these multicarrier modulations are designed to transmit information, especially at high bit rates, their spectral efficiency is fairly high and may, for example, reach 4 bits/Hz (in digital television especially). The conversion of the bits coming from an error correction code into modulation symbols (this process is known as "mapping") will thus be of the QAM (Quadrature Amplitude Modulation) type.

The transmission of a piece of complex data coming from the QAM constellation is therefore implemented differently depending on the type of multicarrier modulation used.

Thus, for a complex type of modulation, the real and imaginary parts of a piece of complex data coming from the QAM constellation are transmitted simultaneously, at every symbol period $T_s$. In the case of the real type of modulation, on the contrary, the real and imaginary parts are transmitted with a temporal shift of half a symbol period $(T_s/2)$ (this is referred to then as the Offset QAM or OQAM).

For a same transmission band and a same number of sub-carriers, in order to transmit the information with the same bit rate, it is necessary, therefore, that the rate at which real-type multicarrier symbols are sent should be twice as fast as the rate for complex-type multicarrier symbols.

Furthermore, these two modes of information transmission are characterized by the density of the associated time-frequency network $d=1/(v_0\tau_0)$. Thus the real-type multicarrier modulations correspond to a density $d=2$, while the complex-type multicarrier modulations correspond to a density $d=1$.

The distinct characteristics of the real-type multicarrier modulations, on the one hand, and of the complex-type multicarrier modulations, on the other hand, induce different processing operations during the implementation of an estimation of the transmission channel. In the case of a real-type multicarrier modulation, and as explained here below in this document, the channel estimation process is indeed made more difficult because the only orthogonality available for the translated functions is orthogonality in the real sense. To provide for clearer understanding of this problem, we shall now seek to describe a known channel estimation technique implemented in the context of a multicarrier modulation as presented here above.

It is assumed, in the reasoning developed here below, that the choice of the parameters of the multicarrier modulation ensures that the channel may be considered to be flat on each of the sub-carriers, for each OFDM symbol. The channel can then be modeled by a complex coefficient to be estimated, $H_{m,n}$ (where m is the index of the sub-carrier and n is that of the OFDM symbol considered).

A classic technique used to estimate the channel in OFDM, consists of the insertion, into the stream of payload carriers, of reference carriers at positions known to the receiver. At reception, the values taken by these reference carriers, known as pilots, are read and the complex gain of the channel at these reference positions is easily deduced. Then, the complex gain of the channel at all the points of the time-frequency network transmitted is derived from the computed value of the complex gain at the reference positions.

In the OFDM/QAM context, a method was envisaged in particular, relying on an implementation of an estimation by reference multicarrier symbols (or preambles). According to this technique, at least one reference symbol is placed at the beginning of a frame, a frame being formed by a set comprising at least one reference symbol, called a preamble, and a set of payload symbols. Through this symbol or these symbols, the channel is estimated on each of the carriers of the multiplex. The choice of the parameters of the system (such as the symbol duration, frame length, etc) ensures that the channel varies slowly relative to symbol time. It is then assumed to be almost constant on a frame. The estimate of the channel on the reference symbols can therefore be used for all the OFDM symbols of the frame. This type of estimation is recommended in the HIPERLAN/2 standard ("Broadband Radio Access Networks (BRAN); HIPERLAN Type 2 Technical Specification; Physical (PHY) layer", DTS/BRAN-0023003, October 1999).

The invention presented in this document can be applied more particularly to this method, known as the method of channel estimation by reference symbols.

As mentioned here above in the case of a multicarrier modulation of the OFDM/OQAM (Offset QAM) type, the channel estimation process is made more difficult because the only orthogonality available for the translated functions is orthogonality in the real sense. Indeed, to estimate the complex gain of the channel on a given sub-carrier, it is necessary to carry out the complex projection of the signal received on the sub-carrier considered. Now, the orthogonality of the translated functions in the real sense and the fact that the prototype functions, even when they are chosen to be localized to the utmost in time-and in frequency, have infinite support on at least one of the two axes, namely the time axis or the frequency axis, imply that, even on an ideal channel, there will be (intrinsic) interference between carriers.

Indeed, in the context of a real type of multicarrier modulation, the imaginary parts of the projection of the signal received on the basis of the translated values of the prototype function is not zero. A disturbance term then appears and gets added to the demodulator signal, and must be corrected before the estimation of the channel is carried out. It is therefore necessary to conceive methods that can be used to compensate for this loss of complex orthogonality and thus overcome the drawbacks of this prior art technique for OFDM(OQAM type modulations.

Indeed, according to the technique explained here above, the invention uses the complex projection of the multicarrier signal received r(t), at the point $(m_0,n_0)$ of the time-frequency space to estimate the channel $\hat{H}_{m_0,n_0}$ at this position. Thus if $\sqrt{E}$ is sent at $(m_0,n_0)$, we have:

$$\hat{H}_{m_0,n_0} = \frac{\int r(t) g^*_{m_0,n_0}(t) dt}{\sqrt{E}}$$

Assuming that the channel is ideal (r(t)=s(t)), we should therefore have: $\hat{H}_{m_0,n_0}=1$.

Now:

$$\int s(t) g^*_{m_0,n_0}(t) = \sqrt{E} + \underbrace{\sum_{(m,n) \neq (m_0,n_0)} a_{m,n} \int g_{m,n}(t) g^*_{m_0,n_0}(t)}_{I_{m_0,n_0} \in iR} \quad \text{(II)}$$

The equation (II) expresses the fact that the complex projection of the perfectly transmitted signal is nevertheless affected by an ISI (inter-symbol interference) intrinsic to the OFDM/OQAM modulations. The term "ISI" refers to interference between temporal symbols and/or between carriers.

The existence of this intrinsic ISI greatly disturbs the estimation of the transmission channel.

The invention is aimed especially at overcoming these drawbacks of the prior art.

More specifically, it is a goal of the invention to provide a technique of multicarrier modulation enabling the cancellation or, at least, the reduction of the intrinsic interference between symbols and/or between carriers.

It is another goal of the invention to implement a technique of multicarrier modulation that is simple and cost little to implement.

It is yet another goal of the invention to provide a technique of multicarrier modulation suited to OFDM/OQAM type systems.

It is also a goal of the invention to implement a technique of multicarrier modulation that can be used to adapt the method of the-channel estimation by reference symbols to OFDM/OQAM type signals.

It is also a goal of the invention to provide a technique of multicarrier modulation to implement a mode of channel estimation by reference symbols that is more precise than estimation using the prior art techniques.

It is yet another goal of the invention to implement a technique of multicarrier modulation enabling improved reception, demodulation and decoding of the multicarrier signal sent.

It is also a goal of the invention to provide a technique of multicarrier modulation for the cancellation or at least the reduction of intrinsic interference on whole OFDM symbols.

SUMMARY OF THE INVENTION

These goals as well as others that shall appear here below are achieved by means of a multicarrier signal consisting of a temporal succession of symbols formed by a set of data elements, each of said data elements modulating a carrier frequency of said signal, said symbols being organized in successive frames each comprising a plurality of symbols, one of said carrier frequencies modulated, at a given point in time, by one of said data elements, being called a carrier.

According to the invention, at least some of said frames each comprise at least one reference symbol integrally consisting of reference data elements known at least to one receiver and complying with at least one constraint on the value of at least one of said reference data elements, so as to obtain the reduction, at reception, of at least one interference term affecting at least another of said reference data elements Thus, the invention relies on an entirely novel and inventive approach to the framing of a multicarrier signal, making it possible to reduce the harmful effects of inter-symbol interference affecting the signal during its transmission. Indeed, to date there is no efficient technique for the reduction of inter-symbol interference and/or inter-carrier interference for OFDM/OQAM type multicarrier modulations. For a COFDM/QAM type multicarrier modulation, it has been envisaged to introduce a guard interval during which no payload information is transmitted, so as to ensure that all the data received belongs to one and the same COFDM/QAM symbol. However, such a technique cannot be used to optimize the bit rate of transmission or broadcasting of the information and is furthermore not applicable to OFDM/OQAM type modulations. The invention therefore proposes an innovative technique for the cancellation of the intrinsic interference affecting the reference symbols of the frames of OFDM symbols, this technique consisting of the imposing of a constraint on the value of at least one of the data elements of such reference symbols.

Advantageously, each of said frames comprises at least one reference symbol integrally formed by reference data elements known to at least one receiver and complying with at least one constraint on the value of at least one of said reference data elements, so as to obtain the reduction, at reception, of at least one interference term affecting at least one of said reference data elements.

According to an advantageous embodiment of the invention, such a signal is an OFDM/OQAM type signal.

Indeed, particular attention is paid to the reduction of the intrinsic inter-symbol and/or inter-carrier interference affecting OFDM/OQAM type signals, especially in order to improve the channel estimation by reference symbols. As mentioned further above in the document, a channel estimation technique of this kind is indeed commonly used for OFDM/QAM type signals, but is made very difficult in the case of real-type modulations, for which the only orthogonality available for the translated terms is an orthogonality in the real sense. It is therefore especially worthwhile to try and improve the channel estimation for this type of multicarrier signal.

According to an advantageous characteristic of the invention, said reference symbol or symbols are placed at the beginning of each of said frames, so as to constitute a preamble of at least one reference symbol.

In this way, it is possible for example to carry out an estimation of the transmission channel at the beginning of each of the symbol frames, and use the computed estimation on the entire frame.

Advantageously, such a signal has the form $$s(t) = \sum_n \sum_{m=0}^{M-1} a_{m,n} e^{i\varphi_{m,n}} e^{2i\pi m v_0 t} g(t - n\tau_0),$$

where g is a predetermined prototype function such that said carriers are orthogonal, and where the terms $a_{m,n}$ are real and represent said data elements, $\tau_0$ being the duration of one of said symbols and $v_0$ being the spacing between said carrier frequencies, with $1/(v_0\tau_0)=2$, and where $\phi_{m,n}=(\pi/2)*(m+n)$, m and n being characteristic of the position, in the frequency space and the time space respectively, of the carrier bearing the data element $a_{m,n}$, and M being the number of carriers of a reference symbol of the signal.

As mentioned here above, according to a classic technique, data elements $a_{m,n}$ with zero value are introduced into the edges of the spectrum, thus modifying the number of terms that effectively play a role in the expression of the above signal. For example, it can be envisaged that the expression of the above signal s(t) will have an even number of frequency sub-bands.

According to an advantageous technique of the invention, said function g is a real and isotropic even-parity function verifying the following relationships:

$$\alpha_1 = A_g(0, v_0) = A_g(0,-v_0) = \alpha_2 = A_g(\tau_0, 0) = A_g(-\tau_0, 0)$$

and $A_g(2mv_0, 2n\tau_0) = \delta_{m,0} \cdot \delta_{n,0}$ for all the pairs (m,n) of integers where $A_g$ is the ambiguity function of said function g.

The characteristics of the ambiguity function $A_g$ of the function g are recalled in Appendix 1.

Preferably, said function g is the Iota function.

It may be recalled that the Iota function, generally denoted by $\Im$, has the characteristic of being identical to its Fourier transform. A prototype Iota function of this kind, described especially in the patent document No FR 2 733 869, is therefore particularly valuable in OFDM/OQAM type multicarrier modulations.

Advantageously, one of said constraints consists of the cancellation, for at least one reference symbol, of an interference term at least partially due to the carriers directly neighboring said reference symbol in the time-frequency space.

Thus for example it is possible to cancel the intrinsic inter-symbol interference (IES) due to the carriers belonging to the first ring of a given carrier of the reference symbol, and possibly an interference term due to the carriers belonging to the second ring surrounding the carrier studied.

Advantageously, said at least one reference symbol comprises at least two modulated carriers additional to the other symbols forming said signal, said additional modulated carriers being placed on the edges of the spectrum of said signal.

Thus, a solution is provided to the problem of the carriers located at the edges of the spectrum of the signal, for which it is not possible to define the full ring.

Preferably, said preamble being constituted by at least three reference symbols, respectively called the preceding symbol, the central symbol and the following symbol, one of said constraints consists of the cancellation, for said central reference symbol, of an interference term due to said preceding symbol and said following symbol.

enabling the cancellation of the intrinsic interference affecting the central symbol. In this exemplary embodiment, e designates the energy of the symbols transmitted on each of the carriers.

According to an advantageous technique of the invention, said preamble consisting of at least five reference symbols, comprising two preceding symbols, one central symbol and two following symbols, one of said constraints consists of the cancellation, for said central symbol, of an interference term due to said two preceding symbols and to said two following symbols.

Care is then taken to cancel the intrinsic interference affecting the central symbol of the preamble, due to the first and second rings of carriers surrounding this central symbol.

Preferably, such a signal complies with the following constraint:

$$C_{m_0,n_0}^{1\&2} = \sum_{(m,n) \in Ring_{m_0,n_0}^{1\&2}} a_{m,n} i_{(m-m_0)+(n-n_0)+(m-m_0)+(n-n_0)} A_g((n_0-n)\tau_0, (m_0-m)v_0) = 0 \text{ with}$$

$$Ring_{m_0,n_0}^{1\&2} = \lfloor (m,n) \text{ such that } ((m-m_0), (n-n_0)) \in \{-2,-1,0,1,2\}^2 \text{ and } (m,n) \neq (m_0,n_0) \rfloor$$

In this way, it is possible to implement a technique for the estimation of the channel from the central symbol of the preamble which, it is ensured, is not affected by the ISI due to the preceding and following symbols. It is thus possible to obtain an estimation of the transmission channel that is far more precise than the estimation according to the prior art techniques.

Advantageously, a signal of this kind complies with the following constraints:

$$(\alpha_{m_0-1,n_0} - \alpha_{m_0+1,n_0})(-1)^{n_0} + \alpha_{m_0,n_0-1} - \alpha_{m_0,n_0+1} = 0$$

and $$\alpha_{m_0-1,n_0-1} + \alpha_{m_0+1,n_0+1} + \alpha_{m_0+1,n_0-1} + \alpha_{m_0-1,n_0+1} = 0$$

where $n_0$ is characteristic of said central symbol and where $m_0 \in [0, M-1]$, M being the number of carriers of a reference symbol of said signal.

According to an advantageous embodiment of the invention, the position of said central symbol in the time space being characterized by the index $n_0$, said central symbol is constituted by a regular pattern comprising an alternation of two carriers bearing a data element with the value $+\sqrt{e}$ and two carriers bearing a data element with the value $-\sqrt{e}$ and, $n_0$ being an even-parity number (and odd-parity number respectively), said preceding symbol is constituted by a regular pattern obtained by making a one-step leftward shift (or rightward shift respectively) in the frequency space of said regular pattern constituting said central symbol, and said following symbol is constituted by a regular pattern obtained by making a one-step rightward shift (or leftward shift respectively) in the frequency space of said regular pattern constituting said central symbol.

Such patterns (for a central symbol within an even-parity index $n_0$ on the one hand and an odd-parity index $n_0$ on the other hand) correspond indeed to structures of the preamble, and where $m_0 \in [0, M-1]$, M being the number of carriers of a reference symbol of said signal.

According to a preferred embodiment of the invention, the position of said central symbol in the time space being characterized by the index $n_0$, said central symbol is constituted by a regular pattern comprising an alternation of two carriers bearing a data element with the value $+\sqrt{e}$ and two carriers bearing a data element with the value $-\sqrt{e}$ and, $n_0$ being an even-parity number (and odd-parity number respectively), said symbol indexed $n_0-1$ is constituted by a regular pattern obtained by making a one-step leftward shift (or rightward shift respectively) in the frequency space of said regular pattern constituting said central symbol, and said following symbol indexed $n_0+1$ is constituted by a regular pattern obtained by making a one-step rightward shift (or leftward shift respectively) in the frequency space of said regular pattern constituting said central symbol, and, $n_0$ being an even-parity number (and odd-parity number respectively), said symbol indexed $n_0-2$ is constituted by a regular pattern obtained by making a one-step leftward shift (or rightward shift respectively) in the frequency space of said regular pattern constituting said symbol indexed $n_0-1$, and said symbol indexed $n_0+2$ is constituted by a regular pattern obtained by making a one-step rightward shift (or leftward shift respectively) in the frequency space of said regular pattern constituting said symbol indexed $n_0+1$.

Thus, the regular patterns presented here above, for the preambles comprising three symbols, are extended to the case of a preamble consisting of five symbols. Again, in this alternative embodiment, e designates for example the energy of the symbols transmitted on each of the carriers.

Advantageously, the length of one of said frames is chosen so as to comply with a hypothesis of invariance of said channel on said frame.

Thus, it is possible to make an estimation of the transmission channel from the central symbol of the preamble, for which it is guaranteed, according to the invention, that it is not affected by the intrinsic interference due to the preceding and following symbols, and then to use this precise estimation on the entire OFDM/OQAM symbol frame received.

The invention also relates to a method for the reception of a multicarrier signal as described here above, implementing the following steps:

a step to estimate the transfer function of a transmission channel, comprising a sub-step to determine the value of at least certain coefficients of said transfer function, implementing, for at least certain of said reference symbols of a frame, a division of the value of said reference elements in reception by the value of said reference elements known when they are sent, so as to obtain an efficient estimation of said channel;

step for the demodulation and/or decoding of the symbols of said frame as a function of the estimation of said transfer function.

Thus, a reception method of this kind can be used, for equal cost, to make multicarrier signal receivers of higher quality than those made according to the prior art techniques. It also makes it possible, for equal quality, to make multicarrier signal receivers that are better priced than those made according to the prior art techniques. Indeed, the cancellation of the intrinsic interference affecting the preamble of the symbol frame sent makes it possible to obtain an estimation of the transmission channel that is far more precise than it is according to the prior art techniques.

Advantageously, for each of said reference carriers, said determining sub-step takes account:

the neighboring carriers defining a ring around said reference carrier, when such a ring exists;

for the reference carriers of the edges of the spectrum of said signal, when said ring is not complete, the coefficients of said transfer function are determined by extrapolation.

Indeed, if the reference symbols and the payload symbols of the signal comprise the same number M of carriers, the above-mentioned constraints imposed on the signal cannot be complied with by the reference carriers of the edge of the spectrum of the signal: indeed, for these carriers, it is not possible to define any full ring of carriers. The term "ring" is understood here to mean the first ring surrounding a carrier, the second ring or any higher-order ring surrounding a given carrier.

An extrapolation has therefore been envisaged for the carriers of the edges of the spectrum of the signal, making it possible to determine the values of the coefficients of the transfer function of the channel associated with these end carriers. The values of such coefficients are extrapolated from the values of the other coefficients of the transfer function, associated with the reference carriers for which the carrier ring or rings exist.

When it is sought to cancel the intrinsic interference due to the first ring of carriers surrounding a given reference carrier, an extrapolation of this kind is of course not necessary if the reference symbols comprise at least two carriers more than the payload symbols, placed respectively on each of the edges of the spectrum of the signal. Similarly, when it is sought for example to cancel the intrinsic interference due to the first and second carrier rings, an extrapolation of this kind is necessary only if the reference symbols comprise at least four carriers more than the payload symbols.

The invention also relates to a receiver and to a sender device as described earlier in this document.

The invention also relates to the method for the construction of a multicarrier symbol formed by a temporal succession of symbols constituted by a set of data elements, each of said data elements modulating a carrier frequency of said signal, said symbols being organized in successive frames, each comprising a plurality of symbols, one of said carrier frequencies modulated, at a given point in time, by one of said data elements, being called a carrier.

According to the invention, at least some of said frames comprise each at least one reference symbol integrally formed by reference data elements known to at least one receiver and complying with at least one constraint on the value of at least one of said reference data elements, so as to reduce, at reception, at least one interference term affecting at least another of said reference data elements.

Advantageously, according to such a method of construction, each of said frames comprises at least one reference symbol integrally formed by reference data elements known to at least one receiver and complying with at least one constraint on the value of at least one of said reference data elements, so as to reduce, at reception, at least one interference term affecting at least one of said reference data elements.

BRIEF DESCRIPTION OF THE DRAWINGS

Other features and advantages of the invention shall appear more clearly from the following description of a preferred embodiment, given by way of the simple non-restrictive illustration and from the appended drawings, of which.

DETAILED DESCRIPTION OF THE REFERRED EMBODIMENTS

The general principle of the invention relies on the introduction of a constraint on the value of at least one data element of a reference symbol in an OFDM/OQAM signal, so as to reduce the intrinsic inter-symbol interference, and therefore enable, in particular, improved channel estimation.

Figure 1:
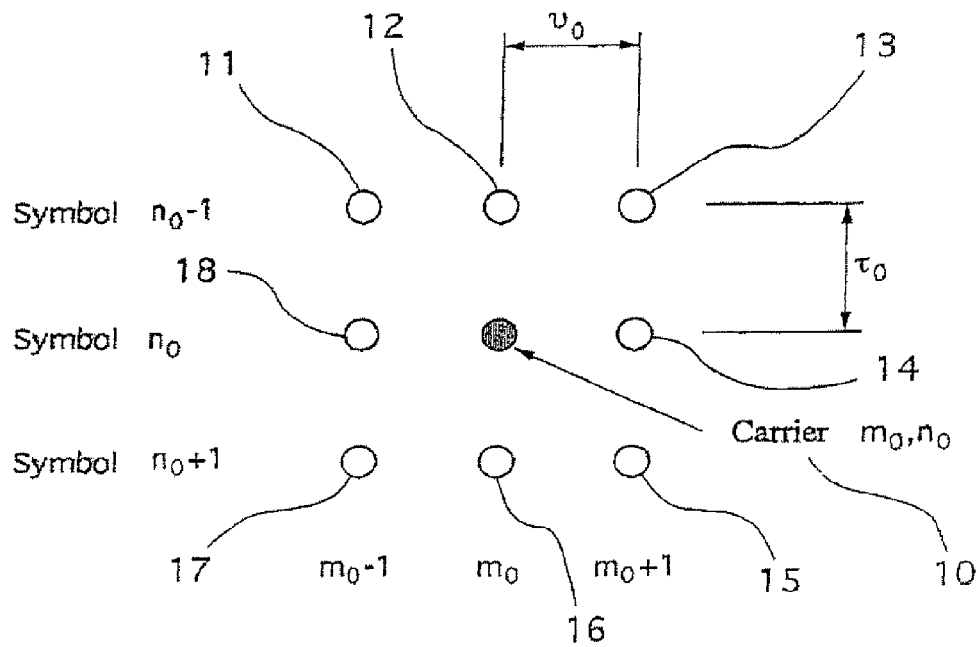
FIG. 1 illustrates the definition of the first ring relative to a given carrier of a multicarrier signal implemented according to the invention.

Referring to FIG. 1, an embodiment is presented of the cancellation of the intrinsic interference due to the first ring of a reference carrier of the preamble.

First of all, a few concepts relating to intrinsic interference are recalled.

1. The Ambiguity Function

The definition and the characteristics of the ambiguity function of a waveform are described, for example, in the patent document No FR 2 733 869. As a reminder, this information is recalled in Appendix 1 of the present patent application. However, the expression of the ambiguity function of the function x(t) may be recalled here:

$$A_x(\tau, v) = \int_{\Re} e^{-2i\pi v t} x(t+\tau/2) x^*(t-\tau/2) dt$$

Some of the properties of the ambiguity function are recalled here:
- if a function x is an even-parity function, its ambiguity function is real;
- if, furthermore, x is real, its ambiguity function is an even-parity function according to the frequency variable $v$;
- if, furthermore, x is isotropic (i.e. if x is equal to its Fourier transform), its ambiguity function is an even-parity function according to the frequency variable $\tau$.

It shall be assumed here below that the prototype function g(t) associated with the multicarrier signal considered verifies these properties. This is especially the case with the waveform Iota, $\Im(t)$, described in the patent document No. FR 2 733 869.

2. Orthogonality of the Sub-Carriers

The complex scalar product of the translated functions $g_{m,n}(t)$ and $g_{m',n'}(t)$ is equal to:

$$\langle g_{m,n} | g_{m',n'} \rangle = \int_{\Re} g_{m,n}(t) \cdot g^*_{m',n'}(t) dt$$

$$\langle g_{m,n} | g_{m',n'} \rangle = \int_{\Re} i^{(m-m')+(n-n')} e^{2i\pi(m-m')v_0 t} g(t-n\tau_0) g^*(t-n'\tau_0) dt$$

On the basis of the equation (III), and assuming the change in variable $u = t - (n+n')\tau_0/2$, we get:

$$\langle g_{m,n} | g_{m',n'} \rangle = i^{(m-m')+(n-n')} \int_{\Re} e^{2i\pi(m-m')v_0(u+(n+n')\tau_0/2)} g\left(u + \frac{n+n'}{2} - n\right)\tau_0\right)$$
$$g^*\left(u + \left(\frac{n+n'}{2} - n'\right)\tau_0\right) du$$

$$\langle g_{m,n} | g_{m',n'} \rangle = i^{(m-m')+(n-n')} e^{i\frac{\pi}{2}(m-m')(n+n')}$$
$$\int_{\Re} e^{-2i\pi(m-m')v_0 u} g(u + (n-n')\tau_0/2) g^*(u - (n'-n)\tau_0/2) du$$

or again:

$$\langle g_{m,n} | g_{m',n'} \rangle = i^{(m-m')+(n-n')+(m-m')(n+n')} A_g((n'-n)\tau_0, (m'-m)v_0) \quad (IV)$$

A necessary condition for the base of functions $\{g_{m,n}(t)\}$ to be orthogonal in the real sense is that g(t) must be an even-parity value and that $A_g(2m v_0, 2n\tau_0) = \delta_{m,0} \cdot \delta_{n,0}$ Indeed, in this case, it is properly verified that: $\forall (m,n)$ integers, $$\langle g_{m,n} | g_{m',n'} \rangle_R = Re(i^{(m-m')+(n-n')+(m-m')(n+n')} A_g((n'-n)\tau_0, (m'-m)v_0)) = \delta_{m,m'} \cdot \delta_{n,n'}$$

Here below, it shall be assumed that g(t) is such that these hypotheses are verified. This is especially the case when g(t) is the Iota function.

3. Intrinsic Interference (ISI) in the Case of an Ideal Channel

For an ideal channel, the interference on the carrier being studied $(m_0, n_0)$ due to the other carriers of the time-frequency network is expressed by $I_{m_0,n_0}$ in the equation (II):

$$I_{m_0,n_0} = \sum_{(m,n) \neq (m_0,n_0)} a_{m,n} \int g_{m,n}(t) g^*_{m_0,n_0}(t)$$

Given the supposedly highly localized character of g(t) in time and frequency, the terms that play a significant role in this interference are due to the carriers directly neighboring the carrier $(m_0, n_0)$. These carriers are shown schematically in FIG. 1: they constitute what we shall call the "first ring" related to the carrier being studied.

Thus, we consider the carrier referenced 10, whose position in the time space (and in the frequency space respectively) is indicated by $n_0$ (and $m_0$ respectively). The carriers referenced 11 to 18, which are direct neighbors of the carrier 10, constitute the first ring of this carrier. They belong to the symbols OFDM having indices $n_0-1$, $n_0$ and $n_0+1$, and correspond to the carrier frequencies having indices $m_0$, $m_0-1$ and $m_0+1$.

$C_{m_0,n_0}$ denotes the reference term representing the first ring, namely the interference term due to the carriers referenced 11 to 18, and $D_{m_0,n_0}$ denotes the interference term due to the other carriers of the time-frequency network.

Let us assume that the values $\alpha_{m,n}$ are the BPSK ("Binary Phase Shift Keying") symbols taken in the alphabet $\{-\sqrt{e},+\sqrt{e}\}$. The symbols $\alpha_{m,n}$ may of course be symbols of any kind. However, with a view to simplification, the description shall be limited to the particular embodiment in which the symbols $a_{m,n}$ can take only two distinct values. The invention can also be applied, in an obvious way, to the case where the symbols $a_{m,n}$ can take a plurality of distinct values, for example four values. If g(t) is the Iota function, it can be shown that:

$$Var_{dB}(D_{m_0,n_0}) = Var_{dB}(C_{m_0,n_0}) - 18,6dB$$

It is therefore seen that the main contribution to the intrinsic interference affecting a carrier $(m_0, n_0)$ of a multicarrier signal is that of the first ring surrounding the carrier considered.

Hereinafter in this document, a description is therefore given of a particular embodiment of the invention in which it is sought to cancel the intrinsic inter-symbol interference due to the first ring, for the carriers of the preamble of a multicarrier signal.

3.1. Interference Due to the Frequency-Shifted Carriers Only

We shall first of all consider the intrinsic interference affecting a carrier, due to the carriers of the first ring sent at the same point in time, but frequency-shifted with respect to the carrier considered.

In this case, $n=n_0$, and:

$$\langle g_{m,n}|g_{m_0,n_0}\rangle = i^{(m-m_0)+(m-m_0)2n_0}A_g(0,(m_0-m)\nu_0) = i^{(m-m_0)(1+2n_0)}A_g(0,(m_0-m)\nu_0)$$

Two cases then have to be envisaged, according to the value of the difference $m-m_0$:

If $m-m_0=1$:

$$\langle g_{m,n}|g_{m_0,n_0}\rangle = i^{(1+2n_0)}A_g(0,-\nu_0) = (-1)^{n_0}iA_g(0,-\nu_0)$$

If $m-m_0=-1$:

$$\langle g_{m,n}|g_{m_0,n_0}\rangle = i^{-(1+2n_0)}A_g(0,\nu_0) = -(-1)^{n_0}iA_g(0,\nu_0)$$

3.2. Interference Due to the Frequency-Shifted Carriers Only

Henceforth, we shall consider the intrinsic interference affecting a carrier, due to the carriers of the first ring sent at the same frequency but time-shifted with respect to the carrier considered.

In this case, $m=m_0$, and:

$$\langle g_{m,n}|g_{m_0,n_0}\rangle = i^{n-n_0}A'_g((n_0-n)\tau_0,0)$$

Two cases then have to be envisaged, according to the value of the difference $n-n_0$:

If $n - n_0 = 1$: $\langle g_{m,n}|g_{m_0,n_0}\rangle = iA_g(-\tau_0, 0)$

If $n - n_0 = -1$: $\langle g_{m,n}|g_{m_0,n_0}\rangle = -iA_g(\tau_0, 0)$

It is therefore deduced, from the above relationships, that the cancellation of the interference, due to the time-shifted carriers only or due to the frequency-shifted carriers only, on the carrier $(m_0,n_0)$ may be expressed by the following relationship:

$$\alpha_1(\alpha_{m_0-1,n_0}-\alpha_{m_0+1,n_0})(-1)^{n_0}+\alpha_2(\alpha_{m_0,n_0-1}-\alpha_{m_0,n_0+1})=0 \quad (V)$$

Where:

$$\alpha_1 = A_g(0,\nu_0) = A_g(0,-\nu_0)$$

$$\alpha_2 = A_g(\tau_0,0) = A_g(-\tau_0,0)$$

$\alpha_{m,n} \in \Re$ is the symbol transmitted on the carrier (m,n)

It will be assumed that, apart from the above-mentioned properties of g(t), the prototype function is such that $\alpha_1=\alpha_2$, which will be denoted as $\alpha$. This is especially the case with the Iota prototype function. The equation (V) can then be written as follows:

$$(\alpha_{m_0-1,n_0}-\alpha_{m_0+1,n_0})(-1)^{n_0}+\alpha_{m_0,n_0-1}-\alpha_{m_0,n_0+1}=0 \quad (VI)$$

It will be noted that, since the equation (VI) depends on the value of $n_0$, we have two distinct equations depending on whether $n_0$ is an even-parity value or an odd-parity value.

3.3. Interference Due to the Time-Shifted and Frequency-Shifted Carriers

Four cases are distinguished in this case, depending on the position of the carrier for which it is sought to cancel the interference within the first ring:

if $m-m_0=1$ and $n-n_0=1$:

$$\langle g_{m,n}|g_{m_0,n_0}\rangle = i^{1+1+2n_0+1}A_g(-\tau_0,-\nu_0) = -(-1)^{n_0}iA_g(-\tau_0,-\nu_0)$$

if $m-m_0=1$ and $n-n_0=-1$:

$$\langle g_{m,n}|g_{m_0,n_0}\rangle = i^{2n_0-1}A_g(\tau_0,-\nu_0) = -(-1)^{n_0}iA_g(\tau_0,-\nu_0)$$

if $m-m_0=-1$ and $n-n_0=1$:

$$\langle g_{m,n}|g_{m_0,n_0}\rangle = i^{-2n_0-1}A_g(-\tau_0,\nu_0) = -(-1)^{n_0}iA_g(-\tau_0,\nu_0)$$

if $m-m_0=-1$ and $n-n_0=-1$:

$$\langle g_{m,n}|g_{m_0,n_0}\rangle = i^{-2n_0-1}A_g(\tau_0,\nu_0) = -(-1)^{n_0}iA_g(\tau_0,\nu_0)$$

Furthermore, the above-mentioned characteristics of g(t) imply that:

$A_g(\tau_0,\nu_0) = A_g(-\tau_0,\nu_0) = A_g(-\tau_0,-\nu_0) = A_g(\tau_0,-\nu_0)$, which will be referenced $\beta$.

It can be deduced from this that the cancellation of the interference due to the time-shifted and frequency-shifted carriers can be expressed by means of the following relationship:

$$(\alpha_{m_0-1,n_0-1}+\alpha_{m_0+1,n_0+1}+\alpha_{m_0+1,n_0-1}+\alpha_{m_0-1,n_0+1})(-1)^{n_0}=0 \quad (VII)$$

Although this equation depends on the value of $n_0$, it can always be cancelled by choosing the following values of $\alpha_{m,n}$:

$$\alpha_{m_0-1,n_0-1}+\alpha_{m_0+1,n_0+1}+\alpha_{m_0+1,n_0-1}+\alpha_{m_0-1,n_0+1}=0 \quad (VIII)$$

Thus, a single relationship is obtained uniting the data element of the first ring, whatever the position of the symbol, i.e. whatever the value of $n_0$.

From the preceding equations, it is deduced therefore that a necessary and sufficient condition to cancel $C_{m_0,n_0}$ is:

$$\alpha(a_{m_0+1,n_0} - a_{m_0-1,n_0}) + (-1)^{n_0}(a_{m_0+1,n_0} - a_{m_0-1,n_0}) - \quad \text{(IX)}$$
$$\beta(a_{m_0+1,n_0+1} + a_{m_0-1,n_0+1} + a_{m_0+1,n_0-1} + a_{m_0-1,n_0+1}) = 0$$

4. Intrinsic Interference (ISI) in the Case of a Realistic Channel

We shall henceforth try to establish the constraint to be complied with by the data elements of the carriers of the first ring to enable the cancellation of the intrinsic interference in the case of a realistic channel.

It may be recalled that for a realistic channel, and given the modeling of the action of the channel referred to hereabove the intrinsic ISI on the carrier $(m_0,n_0)$ is written as follows:

$$I_{m_0,n_0}^{realistic} = \sum_{(m,n)\ne(m_0,n_0)} a_{m,n} H_{m,n} \int g_{m,n}(t) g_{m_0,n_0}^*(t)$$

The intrinsic ISI due to the first ring in this realistic case is therefore equal to:

$$C_{m_0,n_0}^{realistic} = \sum_{(m,n)\in Couronne_{(m_0,n_0)}} a_{m,n} H_{m,n} i^{(m-m_0)+(n-n_0)+(m-m_0)(n+n_0)} A_g((n_0-n)\tau_0, (m_0-m)\nu_0)$$

To be able to simply cancel this intrinsic interference term, it will be assumed that the channel can be considered to be constant on this first ring. Thus, we will have:

$$C_{m_0,n_0}^{realistic} \approx H_{m_0,n_0} \underbrace{\sum_{(m,n)\in Couronne_{m_0,n_0}} a_{m,n} i^{(m-m_0)+(n-n_0)+(m-m_0)(n+n_0)} A_g((n_0-n)\tau_0, (m_0-m)\nu_0)}_{C_{m_0,n_0}}$$

and therefore:

$$\int r(t) g_{m_0,n_0}^*(t) \approx H_{m_0,n_0} a_{m_0,n_0} + H_{m_0,n_0} \underbrace{C_{m_0,n_0}}_{a' \text{ annuler}} + D_{m_0,n_0}^{realiste} \quad \text{(X)}$$

This assumption, which is made in practice, according to the invention, by choosing the parameters of the modulation appropriately, makes it possible to arrive at a cancellation of the same term ($C_{m_0,n_0}$) as in the case of an ideal channel.

7. Framing Operation Limiting the Intrinsic Interference on an Integer OFDM/OQAM Symbol It may be recalled that the invention is based on the conception of a specific preamble enabling the cancellation of the significant part of the intrinsic interference on an entire OFDM/OQAM symbol, and on the framing of the payload information to be transmitted that results from this. This specific preamble, constituting a reference symbol, can then be used for the estimation of the channel. On the basis of the values received on each carrier, it is possible, by simple division by the known sent value, to find the coefficients $H_{n,k}$ which represent a satisfactory estimation of the transmission channel.

It may be recalled that, to implement this kind of channel estimation by reference symbol, the channel is supposed to be almost invariant on the entire frame.

7.1. Preamble

Figure 2:
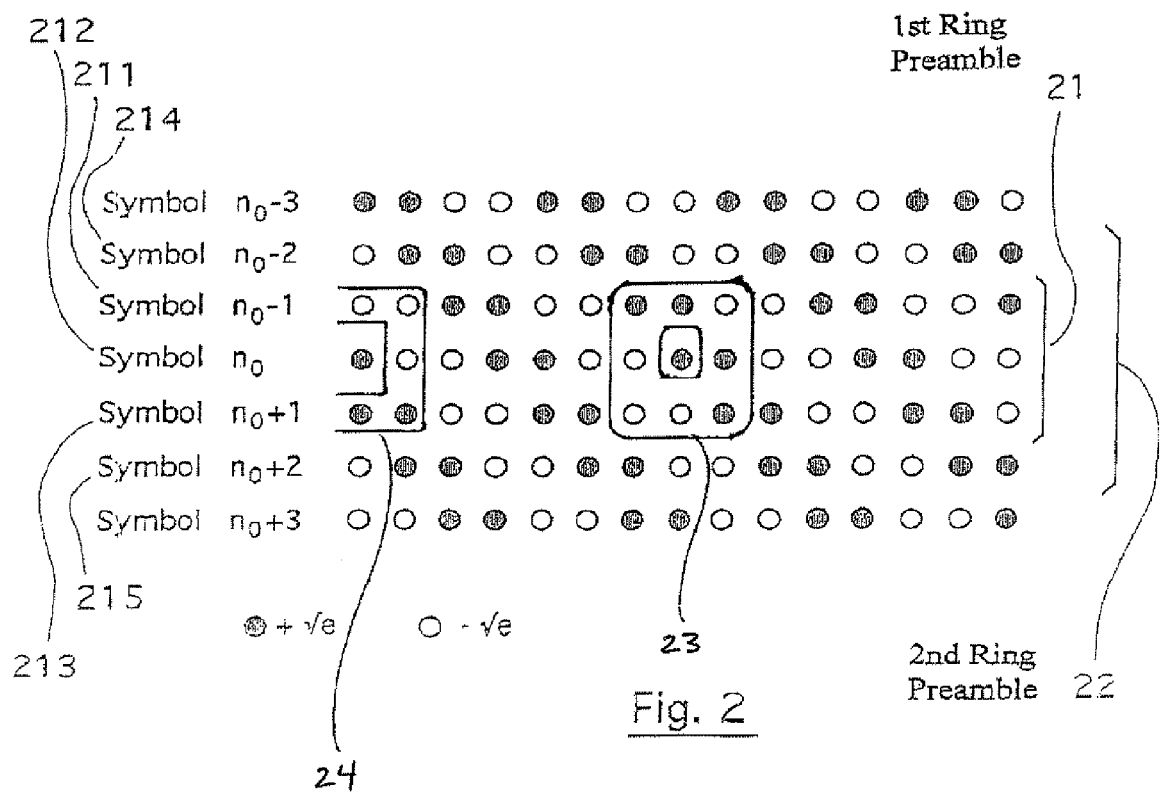
FIG. 2 presents an exemplary structure of a preamble of a frame of OFDM/OQAM symbols, enabling the cancellation of the intrinsic interference affecting the central symbol with an even-parity index $n_0$, due especially to the first ring illustrated in FIG. 1.
Figure 3:
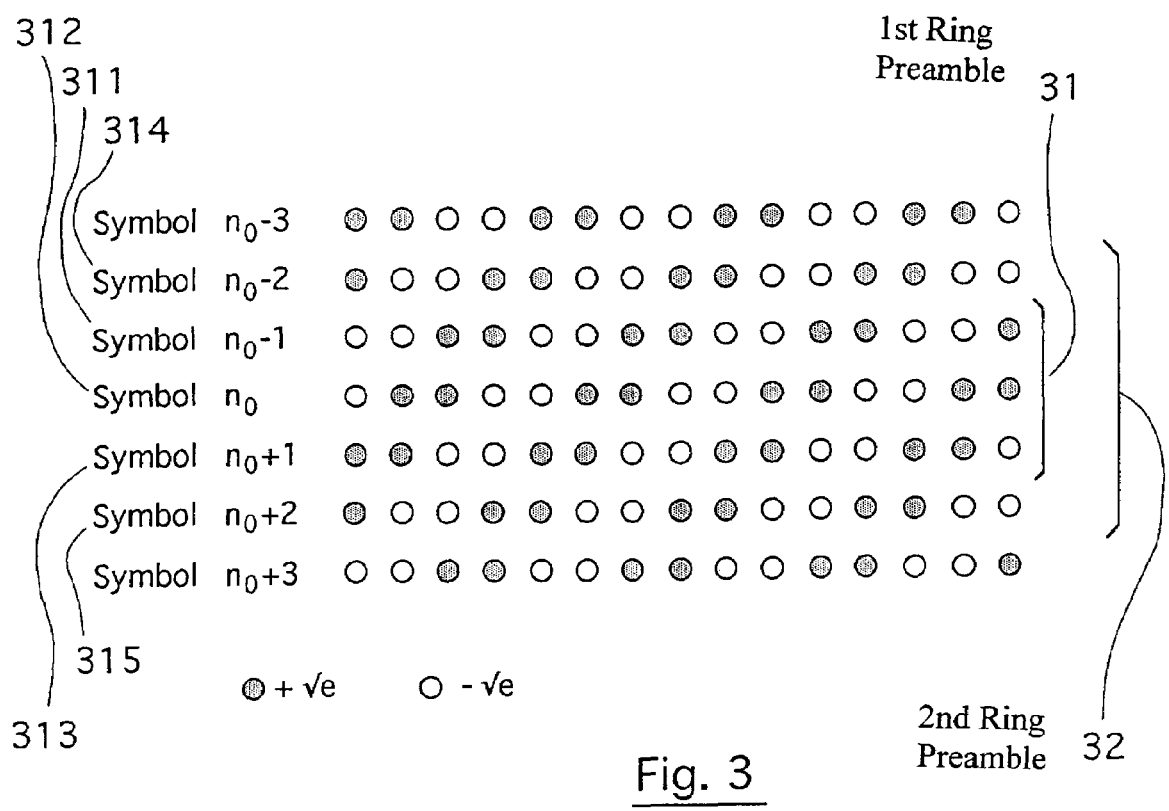
FIG. 3 illustrates an exemplary structure of the preamble of a frame of OFDM/OQAM symbols, enabling the cancellation of the intrinsic interference affecting the central symbol with an odd-parity index $n_0$.

Referring to FIGS. 2 and 3, a description is given of the particular structure of the preambles used to cancel the first and second rings pertaining to a given carrier. FIG. 2 (and FIG. 3 respectively) more particularly present the regular pattern implemented in the preamble for an even-parity value (or odd-parity value respectively) of the index of the central symbol $n_0$.

7.1.1. Cancellation of the ISI Due to the First Ring

For the symbol indexed $n_0$, it is desired that $\forall m \in \{0, \ldots, M-1\}, C_{m,n_0}=0$. Indeed it is desired that, for all the carriers of the central symbol, the intrinsic interference due to the first ring of carriers is zero. For this purpose, a pattern is determined, ensuring that the relationships (IV) and (VI) are verified for $(m,n_0)$, $m=0 \ldots M-1$, where M is the number of carriers of a reference symbol of the signal, except possibly for the reference carriers of the edges of the spectrum of the signal, for which it is not possible to define any complete ring of carriers.

For example, FIG. 2 illustrates a complete first ring 23 (similar to that shown in FIG. 1) having eight carriers that are direct neighbors to a carrier. An incomplete ring 24 is formed at edges of a spectrum and in this example, includes five carriers that are direct neighbors to the edge carrier.

To provide a solution to the problem of the carriers of the edges of the spectrum of the signal, it was envisaged, according to a first alternative embodiment, to transmit reference symbols comprising M carriers, numbered 0 to M−1, and payload symbols comprising only M−2 carriers, numbered 1 to M−2. Thus, the two additional modulated carriers located on each of the edges of the spectrum of the signal make it possible to complete the first ring of the reference carriers indexed 1 and M−2, for which it is possible therefore to verify the equations (IV) and (VI). It will be noted of course that an alternative embodiment of this kind can be applied to the modulated carriers, i.e. when there are no zero carriers on the edges of the spectrum of the signal.

Furthermore, an alternative embodiment of this kind improves the performance of the bandpass filtering of the signal, implemented at reception. Indeed, the width of the bandpass filter implemented according to an alternative embodiment of this kind is determined by the frequency width of the reference symbol or symbols, which is greater than that of the payload symbols, thus enabling improved protection of the payload data.

A second alternative embodiment used to compensate for the problem of the reference carriers located on the edges of the spectrum of the signal consists in transmitting reference symbols and payload symbols comprising M carriers and, during the estimation of the channel, in carrying out an extrapolation of the coefficients of the transfer function of the channel to obtain the coefficients having indices 0 and M−1 as efficiently as possible.

Although these two alternative embodiments are not incompatible, preference is generally given to either one of these two methods.

In a particular embodiment of the invention, shown in FIGS. 2 and 3, it is chosen to use QPSK ("Quadrature Phase Shift Keying") signals for their robustness. The real and imaginary parts of the QPSK symbols may take the values ±√e, e being the energy of the symbols transmitted on each of the carriers. It is also possible of course to choose to use any other type of signals suited to the invention.

To eliminate the interference due to the first ring on an OFDM/OQAM symbol, it is necessary, according to the invention, to take account of the preceding symbol and the following symbol. Thus a preamble 21 (and 31 respectively) is chosen. This preamble is formed by three symbols OFDM/OQAM 211, 212 and 213, (and 311, 312 and 313 respectively ) as shown in FIG. 2 (and FIG. 3 respectively). A check is then carried out on the cancellation of the relationships (VI) and (VIII) on the central symbol 212 (and 312 respectively) of the preamble, in assuming that the transmission channel is constant on the first carrier ring, constituted by the preceding symbol 211 (and 311 respectively) and following symbol 213 (and 313 respectively).

The specific preamble enabling the cancellation of the ISI due to the first ring on the symbol 212 (and 312 respectively) indexed $n_0$ for the even-parity values (and odd-parity values respectively) of $n_0$ is shown in FIG. 2 (and in FIG. 3 respectively).

It will be noted that, according to the particular embodiment shown in FIGS. 2 and 3, the central symbol 212 (and 312 respectively) indexed $n_0$ consists of an alternation of two carriers whose data element is equal to +√e, and two carriers whose data element is equal to −√e.

In the case of an even-parity central symbol 212 indexed $n_0$, the preceding symbol 211 (and the following symbol 213 respectively) is obtained from the central symbol 212 by shifting the carriers one step leftward (or rightward respectively) in the frequency space.

In the case of an odd-parity central symbol 312 indexed $n_0$, the preceding symbol 311 (and the following symbol 313 respectively) is obtained from the central symbol 212 by shifting the carriers one step rightward (or leftward respectively) in the frequency space.

7.1.2. Cancellation of the ISI Due to the First Two Rings

It is assumed that the prototype function g(t) is real and even, and that it is such that $A_g(2n\tau_0, 2mv_0) = \delta_{m,0} \cdot \delta_{n,0}$.

It can then be shown that, by considering a preamble 22 (or 32 respectively) formed by 5 consecutive symbols of the patterns shown in FIGS. 2 and 3, and assuming that, on these 5 symbols, the channel is invariant, the intrinsic interference (ISI) due to the second ring on the central symbol 212 (and 312 respectively) is also cancelled.

Let $$C_{m_0,n_0}^{1\&2}$$

denote the ISI corresponding to these first two rings:

$$C_{m_0,n_0}^{1\&2} = \sum_{(m,n) \in Ring_{m0,n0}^{1\&2}} a_{m,n} i_{(m-m_0)+(n-n_0)+(m-m_0)(n+n_0)} A_g((n_0-n)\tau_0, (m_0-m)v_0) = 0 \text{ with}$$

$$Ring_{m0,n0}^{1\&2} = \lfloor (m,n) \text{ such that } ((m-m_0), (n-n_0)) \in \{-2, -1, 0, 1, 2\}^2 \text{ and } (m,n) \neq (m_0, n_0) \rfloor$$

where $m_0 \in [0, M-1]$, except possibly for the reference carriers located on the edges of the spectrum of the signal, i.e. for the carriers indexed 0 and M−1.

As mentioned here above, to compensate for the problem of the carriers of the edges of the spectrum of the signal, it is possible, during the estimation of the channel, to implement an extrapolation of the coefficients of the transfer function of the channel, so as to make the best possible determination of the coefficients indexed 0, 1, M−2 and M−1, associated with the carriers of the edges of the spectrum of the signal.

It is also possible to envisage the transmission of the reference symbols that comprise more carriers than the payload symbols. For example, it is possible to constitute reference symbols comprising M carriers, indexed 0 to M−1, and payload symbols comprising M−4 carriers, indexed 2 to M−3. In this way, it is ensured that the first and second rings of the reference carriers indexed 2 and M−3 are complete.

Although these two methods are not incompatible, preference is generally given to either of these alternative embodiments to resolve the problem of the reference carriers of the edges of the spectrum of the signal.

The structure of a preamble 22 (and 32 respectively) formed by five symbols 211 to 215 (and 311 to 315 respectively) for a central symbol 212 (and 312 respectively) indexed $n_0$ as an even-parity value (and odd-parity value respectively) is illustrated in FIG. 2 (and FIG. 3 respectively).

A preamble 22 of this kind is constituted by the preamble 21, corresponding to the cancellation of the interference due to the first ring, and by two symbols referenced 214 and 215. The symbol referenced 214 (and 215 respectively) is obtained from the preceding symbol 211 (and the following symbol 213 respectively) by causing the carriers to make a one-step leftward shift (or rightward shift respectively) in the frequency space, when the index $n_0$ of the central symbol 212 is an even-parity value.

Similarly a preamble 32 of this kind is constituted by the preamble 31, corresponding to the cancellation of the interference due to the first ring, and by two symbols referenced 314 and 315. The symbol referenced 314 (and 315 respectively) is obtained from the preceding symbol 311 (and the following symbol 313 respectively) by causing the carriers to make a one-step rightward shift (or leftwatd shift respectively) in the frequency space, when the index $n_0$ of the central symbol 312 is an odd-parity value 7.2. Framing For a transmission or broadcasting system implementing an OFDM/OQAM type modulation, the framing (the frame is called a "burst" according to the Hiperlan/2 standard) resulting from the particular channel estimation described here above therefore comprises:

a preamble, for which the part dedicated to the estimation of the channel has a structure similar to the one illustrated in FIGS. 2 and 3;

a part dedicated to the payload information ("payload" being the term used in the Hiperlan/2 standard) formed by a set of OFDM/OQAM symbols conveying the payload information, for which the recovery of the data uses the estimation of the channel made at the preamble.

Clearly, the total frame length will be chosen so as to comply with the assumption of invariance of the channel on the frame.

Figure 4:
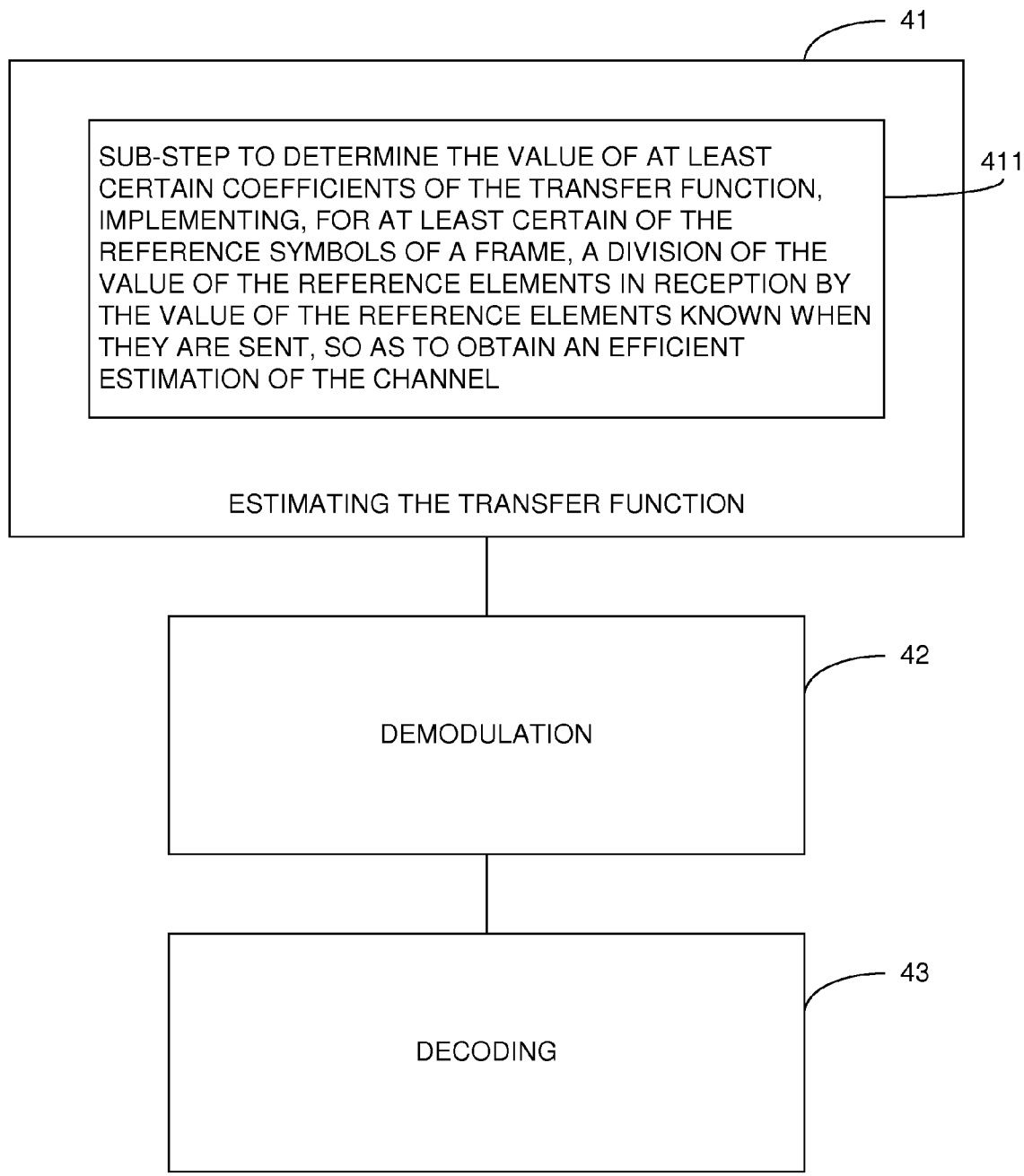
FIG. 4 discloses the main steps of a method for the reception of a multicarrier signal according to the invention.

FIG. 4 discloses steps of a method for receiving a multicater signal. These steps, as discussed in the HIPERLAN/2 are:

a step 41 of estimating the transfer function, a step 42 of demodulation, and a step 43 of decoding.

The concepts presented herein improve step 41 of estimating the transfer function by optimizing by determining, in step 411, the value of the coefficients of the transfer function as discussed herein.

APPENDIX 1

REMINDERS ON THE AMBIGUITY FUNCTION

1. DEFINITIONS

Let us take a function x(t) and its Fourier transform X(f). Its temporal and frequency products can be associated with it. These are respectively defined by:

$$\gamma_x(t,\tau) = x(t+\tau/2)\, x^*(t-\tau/2)$$

$$\Gamma_x(f,v) = X(f+v/2)\, X^*(f-v/2)$$

The Wigner-Ville transform and the ambiguity function of x are then given by:

$$\begin{cases} W_x(t,f) = \int \gamma_x(t,\tau) e^{-2i\pi f\tau} d\tau = \int \Gamma_x(f,v) e^{2i\pi vt} dv \\ A_x(\tau,v) = \int \gamma_x(t,\tau) e^{-2i\pi vt} dt = \int \Gamma_x(f,v) e^{2i\pi f\tau} df \end{cases}$$

2. PROPERTIES OF SYMMETRY OF THE AMBIGUITY FUNCTION

Let us take a function x(t). The notations $x_-$ and $\tilde{x}$ respectively will denote the functions defined as follows:

$$\begin{cases} x^-(t) = x(-t) \\ \tilde{x}(t) = x^*(-t) \end{cases}$$

We then have the relationships:

$$A_x(\tau,v) = \int e^{-2i\pi vt} x(t+\tau/2)\, x^*(t-\tau/2) dt \text{ or by laying down } u = -t:$$

$$A_x(\tau,v) = \int e^{2i\pi vu} x(-u+\tau/2) x^*(-u-\tau/2) du =$$

$$\int e^{2i\pi vu} x(u-\tau/2) x^*(u+\tau/2) du = A_x^*(\tau,v)$$

It is concluded from this, in particular, that if a function x is an even-parity value, i.e. if $x = x^-$, its ambiguity function is real. Furthermore, the following relationship will be noted:

$$A_{\tilde{x}}(\tau,v) = \int e^{-2i\pi vt} x^*(u+\tau/2) x(u-\tau/2) du = A_x(-\tau,v)$$

By combining these two relationships, we get:

$$A_{\tilde{x}}(\tau,v) = A_x(\tau,-v)$$

3. AMBIGUITY FUNCTION AND FOURIER TRANSFORM

The definition of the ambiguity function can be rewritten as follows:

$$A_x(\tau,v) = \int \Gamma_x(f,v)e^{2i\pi f\tau}df = \int \gamma_X(f,v)e^{2i\pi f\tau}df = A_X(v,-\tau)$$

or again $A_X(\tau,v) = A_x(-v,\tau)$

4. AMBIGUITY FUNCTION AND FREQUENCY TIME TRANSLATION

Let us consider a translated function of any prototype function x(t), namely:

$$x_k = e^{i\varphi_k}e^{2i\pi v_k t}x(t-\tau_k)$$

The associated ambiguity function is written as follows:

$$A_{x_k}(\tau,v) = \int e^{-2i\pi v t}e^{i\varphi_k}e^{2i\pi v_k(t+\tau/2)}x(t-\tau_k+\tau/2)e^{-i\varphi_k}e^{-2i\pi v_k(t-\tau/2)}x^*(t-\tau_k-\tau/2)dt =$$

$$\int e^{-2i\pi v t}e^{2i\pi v_k \tau}x(t-\tau_k+\tau/2)x^*(t-\tau_k-\tau/2)dt$$

that is, by taking $u = t - \tau_k$:

$$A_{x_k}(\tau,v) = e^{2i\pi(v_k\tau-v\tau_k)}\int e^{-2i\pi v u}x(u+\tau/2)x^*(u-\tau/2)du = e^{2i\pi(v_k\tau-v\tau_k)}A_x(\tau,v)$$

5. ORTHOGONALITY AND AMBIGUITY FUNCTION

General case

We consider two translated functions of a same function x(t), i.e.:

$$x_k = e^{i\varphi_k}e^{2i\pi v_k t}x(t-\tau_k)$$

$$x_{k'} = e^{i\varphi_{k'}}e^{2i\pi v_{k'} t}x(t-\tau_{k'})$$

The scalar product of these two functions is written as:

$$\langle x_k | x_{k'} \rangle = e^{i(\varphi_k-\varphi_{k'})}\int e^{2i\pi(v_k-v_{k'})t}x(t-\tau_k)x^*(t-\tau_{k'})dt$$

that is, by taking $u = t - (\tau_k + \tau_{k'})/2$:

$$\langle x_k | x_{k'} \rangle = e^{i(\varphi_k-\varphi_{k'})}e^{2i\pi(v_k-v_{k'})(\tau_k+\tau_{k'})}\int e^{2i\pi(v_k-v_{k'})u}x(u+(\tau_{k'}-\tau_k)/2)x^*(u-(\tau_{k'}-\tau_k)/2)du$$

$$= e^{i(\varphi_k-\varphi_{k'})}e^{2i\pi(v_k-v_{k'})(\tau_k+\tau_{k'})}A_x(\tau_{k'}-\tau_k,v_{k'}-v_k)$$

The invention claimed is:

1. A process for transmitting a multicarrier signal comprising a temporal succession of symbols formed by a set of data elements, said symbols being organized in successive frames each comprising a plurality of symbols, the process comprising:

modulating by each of said data elements a carrier frequency of said signal, one of said carrier frequencies modulated, at a given point in time, by one of said data elements being called a carrier, placing in each of at least some of said frames at least one reference symbol integrally comprising reference data elements known at least to one receiver and complying with at least one constraint on the value of at least one of said reference data elements, so as to obtain the reduction, at reception, of at least one interference term affecting at least another of said reference data elements, wherein one of said constraints comprises the cancellation, for at least one reference symbol, of an interference term at least partially due to the carriers directly neighboring said reference symbol in the time-frequency space so that channel estimation is improved in a receiver of said signal, and transmitting the signal.

2. The process according to claim 1, characterized in that each of said frames comprises at least one reference symbol integrally formed by reference data elements known to at least one receiver and complying with at least one constraint on the value of at least one of said reference data elements, so as to obtain the reduction, at reception, of at least one interference term affecting at least one of said reference data elements.

3. The process according to claim 2, characterized in that the signal is of the Orthogonal Frequency Division Multiplexed/Orthogonal Quadrature Amplitude Modulated (OFDM/OQAM) type.

4. The process according to claim 1, characterized in that the step of placing comprises placing said reference symbol or symbols at the beginning of each of said frames, so as to constitute a preamble of at least one reference symbol.

5. The process according to claim 4, characterized in that, said preamble being constituted by at least three reference symbols, respectively called a preceding symbol, a central symbol and a following symbol, one of said constraints comprises the cancellation, for said central reference symbol, of an interference term due to said preceding symbol and said following symbol.

6. The process according to claim 5, characterized in that, the position of said central symbol in the time space being characterized by the index $n_0$, said central symbol is constituted by a regular pattern comprising an alternation of two carriers bearing a data element with the value $+\sqrt{e}$ and two carriers bearing a data element with the value $-\sqrt{e}$, and in that, $n_0$ being an even-parity number (and odd-parity number respectively), said preceding symbol is constituted by a regular pattern obtained by making a one-step leftward shift (or rightward shift respectively) in the frequency space of said regular pattern constituting said central symbol, and said following symbol is constituted by a regular pattern obtained by making a one-step rightward shift (or leftward shift respectively) in the frequency space of said regular pattern constituting said central symbol.

7. The process according to claim 4, characterized in that, said preamble comprises at least five reference symbols, comprising two preceding symbols, one central symbol and two following symbols, one of said constraints comprises the cancellation, for said central symbol, of an interference term due to said two preceding symbols and to said two following symbols.

8. The process according to claim 7, and further comprising constraining the signal with the following constraint:

$$C^{1\&2}_{m_0,n_0} = \sum_{(m,n)\in Ring^{1\&2}_{m_0,n_0}} a_{m,n} i_{(m-m_0)+(n-n_0)+(m-m_0)(n+n_0)} A_g((n_0-n)\tau_0, (m_0-m)\nu_0) = 0 \text{ with}$$

$$Ring^{1\&2}_{m_0,n_0} = \{(m,n) \text{ such that } ((m-m_0), (n-n_0)) \in \{-2,-1,0,1,2\}^2 \text{ and } (m,n) \neq (m_0,n_0)\}$$

where $m_0 \in [0, M-1]$, M being the number of carriers of a reference symbol of said signal.

9. The process according to claim 7, characterized in that, the position of said central symbol in the time space being characterized by the index $n_0$, said central symbol is constituted by a regular pattern comprising an alternation of two carriers bearing a data element with the value $+\sqrt{e}$ and two carriers bearing a data element with the value $-\sqrt{e}$, and in that, $n_0$ being an even-parity number (and odd-parity number respectively), said symbol indexed $n_0-1$ is constituted by a regular pattern obtained by making a one-step leftward shift (or rightward shift respectively) in the frequency space of said regular pattern constituting said central symbol, and said symbol indexed $n_0+1$ is constituted by a regular pattern obtained by making a one-step rightward shift (or leftward shift respectively) in the frequency space of said regular pattern constituting said central symbol, and in that, $n_0$ being an even-parity number (and odd-parity number respectively), said symbol indexed $n_0-2$ is constituted by a regular pattern obtained by making a one-step leftward shift (or rightward shift respectively) in the frequency space of said regular pattern constituting said symbol indexed $n_0-1$, and said symbol indexed $n_0+2$ is constituted by a regular pattern obtained by making a one-step rightward shift (or leftward shift respectively) in the frequency space of said regular pattern constituting said symbol indexed $n_0+1$.

10. The process according to claim 1, and further comprising transmitting the signal in the form $$s(t) = \sum_{n} \sum_{m=0}^{M-1} a_{m,n} e^{i\varphi_{m,n}} e^{2i\pi m \nu_0 t} g(t - n\tau_0),$$

where g is a predetermined prototype function such that said carriers are orthogonal, and where the terms $a_{m,n}$ are real and represent said data elements, $\tau_0$ being the duration of one of said symbols and $\nu_0$ being the spacing between said carrier frequencies, with $1/(\nu_0 \tau_0) = 2$, and where $\phi_{m,n} = (\pi/2)*(m+n)$, m and n being characteristic of the position, in the frequency space and the time space respectively, of the carrier bearing the data element $a_{m,n}$, and M being the number of carriers of a reference symbol of said signal.

11. The process according to claim 10, characterized in that said function g is a real and isotropic even-parity function verifying the following relationships:

$$\alpha_1 = A_g(0,\nu_0) = A_g(0,-\nu_0) = \alpha_2 = A_g(\tau_0,0) = A_g(-\tau_0,0)$$

and $A_g(2m\nu_0, 2n\tau_0) = \delta_{m,0} \cdot \delta_{n,0}$ for all the pairs $(m,n)$ of integers where $A_g$ is the ambiguity function of said function g.

12. The process according to claim 10, characterized in that said function g is the Iota function.

13. The process according to claim 10, characterized in that:

the step of placing comprises placing said reference symbol or symbols at the beginning of each of said frames, so as to constitute a preamble of at least one reference symbol, said preamble being constituted by at least three reference symbols, respectively called a preceding symbol, a central symbol and a following symbol, one of said constraints comprises the cancellation, for said central reference symbol, of an interference term due to said preceding symbol and said following symbol, said function g is a real and isotropic even-parity function verifying the following relationships:

$$\alpha_1 = A_g(0,\nu_0) = A_g(0,-\nu_0) = \alpha_2 = A_g(\tau_0,0) = A_g(-\tau_0,0)$$

and $A_g(2m\nu_0, 2n\tau_0) = \delta_{m,0} \cdot \delta_{n,0}$ for all the pairs $(m,n)$ of integers where $A_g$ is the ambiguity function of said function g, and that it complies with the following constraints:

$$(\alpha_{m_0-1,n_0} - \alpha_{m_0+1,n_0})(-1)^{n_0} + \alpha_{m_0,n_0-1} - \alpha_{m_0,n_0+1} = 0$$

and $$\alpha_{m_0-1,n_0-1} + \alpha_{m_0+1,n_0+1} + \alpha_{m_0+1,n_0-1} + \alpha_{m_0-1,n_0+1} = 0$$

where $n_0$ is characteristic of said central symbol and where $m_0 \in [0, M-1]$, M being the number of carriers of a reference symbol of said signal.

14. The process according to claim 1, characterized in that said at least one reference symbol comprises at least two modulated carriers additional to the other symbols forming said signal, said additional modulated carriers being placed on the edges of the spectrum of said signal.

15. The process according to claim 1, characterized in that the length of one of said frames is chosen so as to comply with a hypothesis of invariance of said channel on said frame.

16. The process of claim 1 and further comprising reception of a multicarrier signal transmitted according to any of the claims 1 to 16, wherein the reception implements the following steps:

a step to estimate the transfer function of a transmission channel, comprising a sub-step to determine the value of at least certain coefficients of said transfer function, implementing, for at least certain of said reference symbols of a frame, a division of the value of said reference elements in reception by the value of said reference elements known when they are sent, so as to obtain an efficient estimation of said channel;

a step for the demodulation and/or decoding of the symbols of said frame as a function of the estimation of said transfer function.

17. The process according to claim 16, wherein said determining sub-step takes account, for each of said reference carriers:

of the neighboring carriers defining a ring around said reference carrier, when such a ring exists that includes direct neighbor carriers on all sides of said reference carrier;

for the reference carriers of the edges of the spectrum of said signal, when said ring is not complete such that direct neighbor carriers are not provided on all sides of said reference carrier, the coefficients of said transfer function are determined by extrapolation.

18. Device adapted for sending a multicarrier signal comprising a temporal succession of symbols formed by a set of data elements, said symbols being organized in successive frames each comprising a plurality of symbols, the device comprising:

means for modulating by each of said data elements a carrier frequency of said signal, one of said carrier frequencies modulated, at a given point in time, by one of said data elements being called a carrier, and means for placing in each of at least some of said frames at least one reference symbol integrally comprising reference data elements known at least to one receiver and complying with at least one constraint on the value of at least one of said reference data elements, so as to obtain the reduction, at reception, of at least one interference term affecting at least another of said reference data elements, wherein one of said constraints comprises the cancellation, for at least one reference symbol, of an interference term at least partially due to the carriers directly neighboring said reference symbol in the time-frequency space so that channel estimation is improved in a receiver of said signal.

* * * * *